Figure 1:
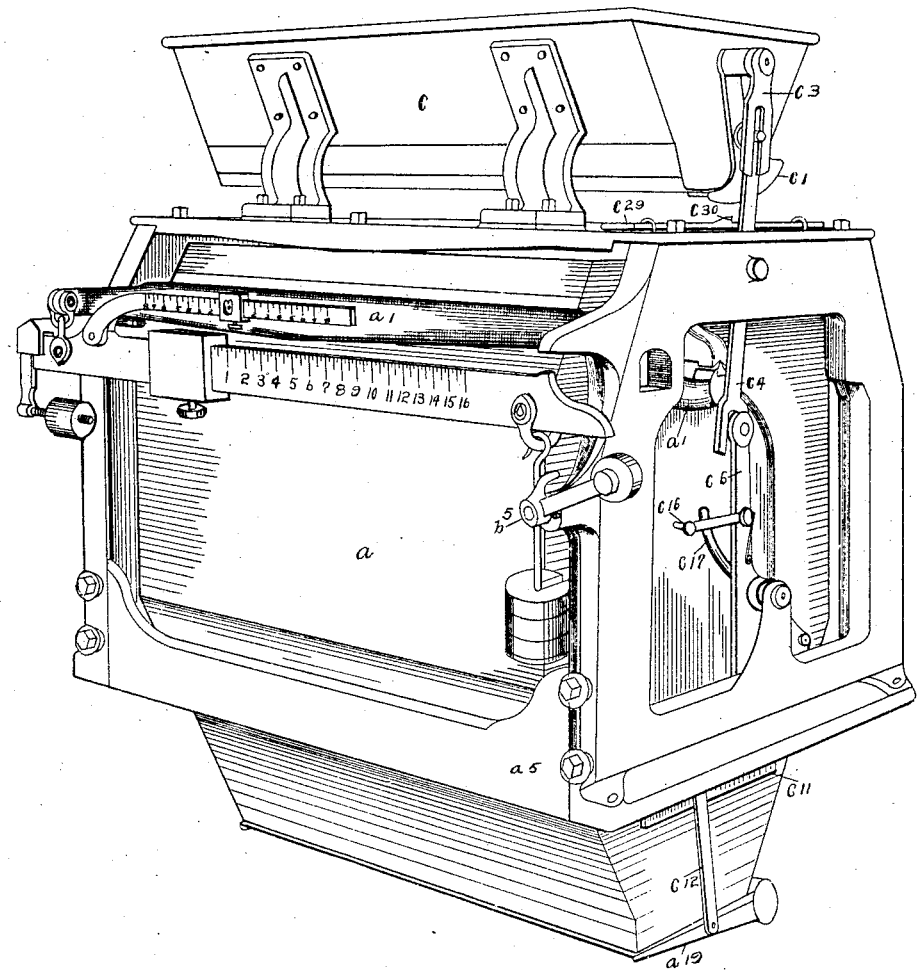

A. SONANDER.
AUTOMATIC WEIGHING APPARATUS.
APPLICATION FILED JAN. 3, 1908.

942,942.

Patented Dec. 14, 1909.
5 SHEETS—SHEET 1.

A. SONANDER.
AUTOMATIC WEIGHING APPARATUS.
APPLICATION FILED JAN. 3, 1908.

942,942.

Patented Dec. 14, 1909.

5 SHEETS—SHEET 4.

Inventor
Andrew Sonander

Witnesses
By Staley & Bowman
Attorneys

A. SONANDER.
AUTOMATIC WEIGHING APPARATUS.
APPLICATION FILED JAN. 3, 1908.

942,942. Patented Dec. 14, 1909.
5 SHEETS—SHEET 5.

Inventor
Andrew Sonander

Witnesses
B. H. Winters
Chas. I. Welch

By Haley & Burman
Attorneys

UNITED STATES PATENT OFFICE.

ANDREW SONANDER, OF SPRINGFIELD, OHIO, ASSIGNOR TO THE AMERICAN GRAIN METER COMPANY, OF SPRINGFIELD, OHIO, A CORPORATION OF OHIO.

AUTOMATIC WEIGHING APPARATUS.

942,942.  Specification of Letters Patent.  Patented Dec. 14, 1909.

Application filed January 3, 1908. Serial No. 409,109.

*To all whom it may concern:*

Be it known that I, ANDREW SONANDER, a citizen of the United States, residing at Springfield, in the county of Clark and State of Ohio, have invented certain new and useful Improvements in Automatic Weighing Apparatus, of which the following is a specification.

My invention relates to improvements in automatic weighing apparatus and particularly to an automatic attachment for standard weighing apparatus. I use the word "standard" in a descriptive sense meaning weighing apparatus or scales that are commercially accepted and in common use.

My invention is designed to operate automatically, receiving, weighing and discharging in predetermined units material that flows by gravitation.

The object of my improvement is to provide for commercial purposes in the weighing of material that flows by gravitation, a self-contained automatic scale that is accurate, simple in construction and of operation, that possesses the attributes and functions of the common standard scale, that is similar in operation and that possesses inherently the means for testing as to the accuracy of its automatic weighing.

Also, it is the object of my improvement to secure direct, positive, and visual results in automatic weighing as in common weighing.

Also, it being common practice to divide each automatic weighing into two operations, during the first operation the major part of the load of material being received in the weighing receptacle and in a much larger stream than during the second operation when the stream is greatly reduced and is commonly said to "dribble", it is the object of my improvement, by providing supplemental means not in service during the said first operation, to independently weigh the material received in the weighing receptacle during the said second or dribble operation.

Also, it is the object of my improvement, by additional supplemental means, to make it practical to positively set my automatic scale so that at each operation thereafter the exact weight of material as predetermined and as indicated on the weigh beam will be received, weighed and discharged.

Also, it is the object of my improvement to secure the greatest capacity for my apparatus by receiving in the weighing receptacle during the said first operation the maximum percentage of the total load.

It is also a primary object of my improvement to minimize manufacturing cost and to provide a simple, compact automatic scale similar in operation and manipulation to the ordinary scale and therefore requiring the minimum of experience to operate, and minimum care.

I employ as the foundation for my improvement a standard scale preferably of the lever type, with a movable weighing receptacle adapted to the material to be weighed, and connected by suitable levers to the one part of a balancing member or weigh beam, the longer part thereof being graduated to any system of weight and provided with the usual movable poise, poise pendant, poise weights, balance ball, etc., as in the common scale, all suspended from a suitable frame, constituting a complete independent scale, on which any material to which the weighing receptacle can be adapted may be weighed in the usual way and which can be tested in the usual way by standard weights furnished for that purpose.

While I preferably employ a standard scale of the lever type employing a weigh beam of the steelyard type, I do not limit myself to that specific construction of weighing apparatus.

The above weighing mechanism, when the automatic attachment for causing the machine to discharge automatically is connected up, becomes a structural part of the entire machine providing means whereby the material is actually weighed at each complete automatic operation of the machine. The automatic attachment can instantly be disconnected leaving the standard scale intact.

In the drawings I have shown a weigh beam graduated to U. S. standard of weight, and in the following descriptions U. S. standard unit terms, viz:—pounds and ounces, will be used.

Figure 2:
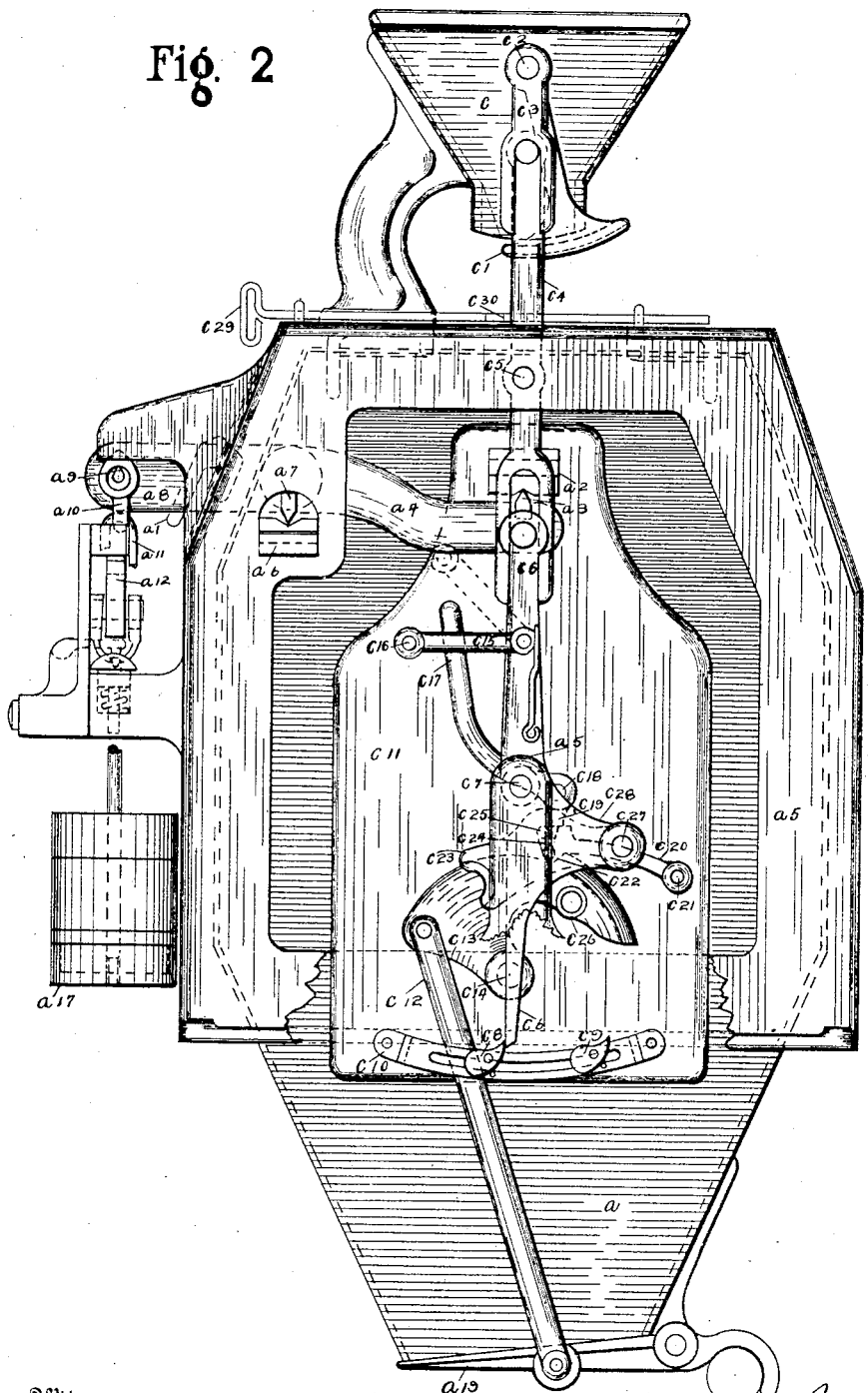
Figure 3:
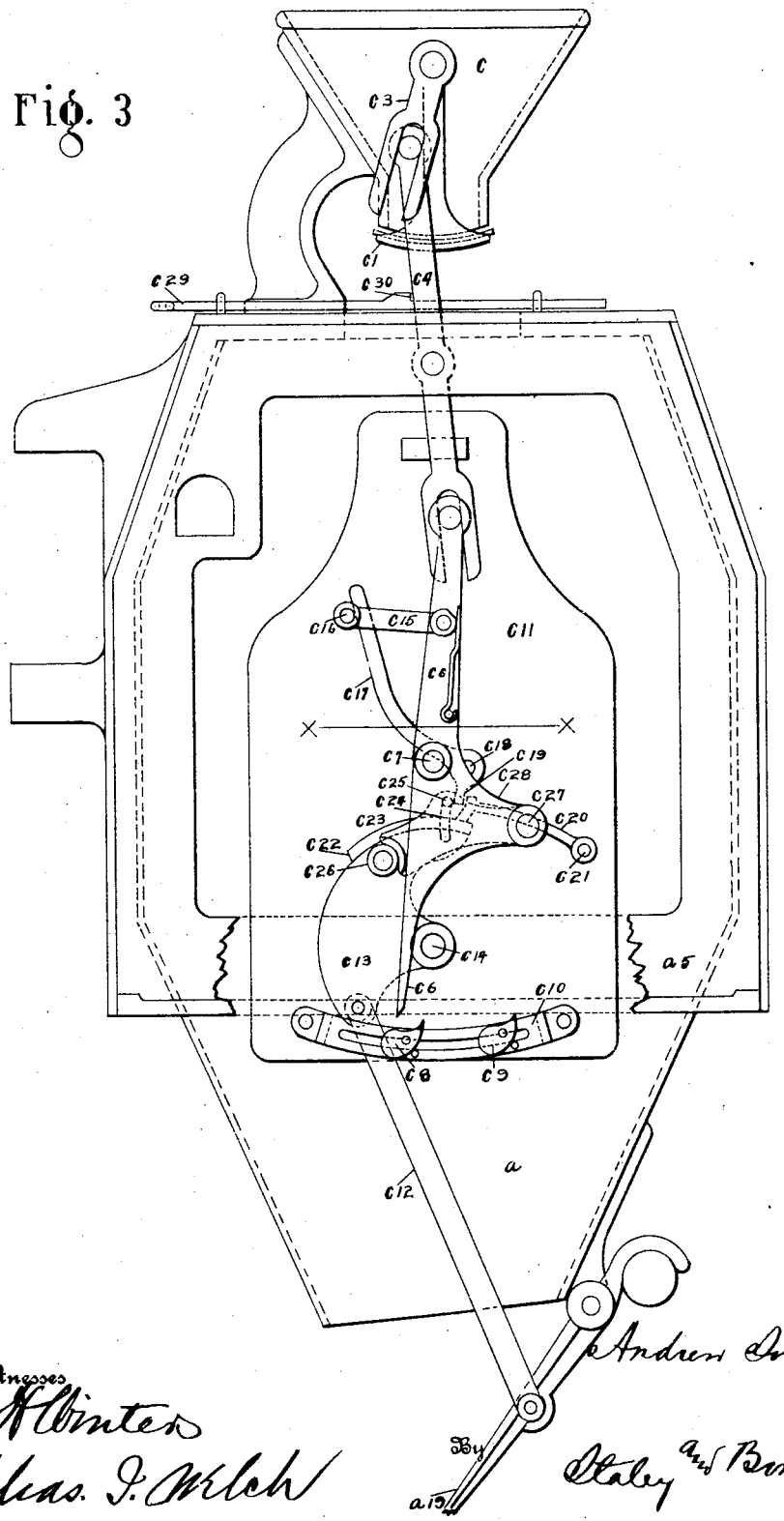
Figure 4:
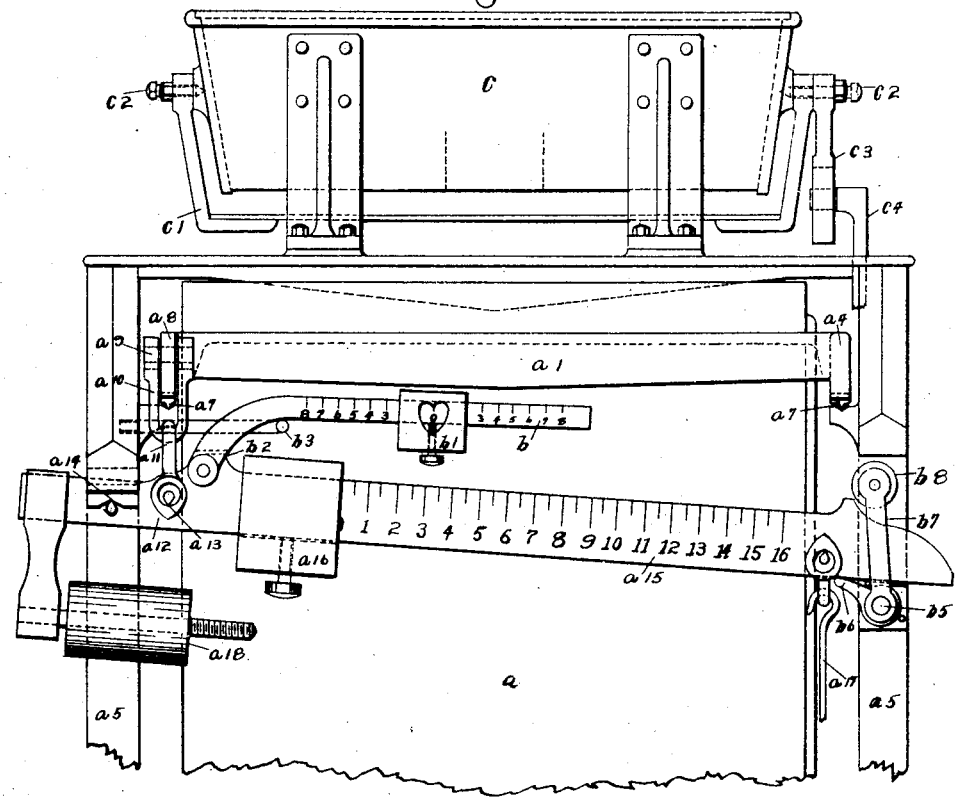
Figure 5:
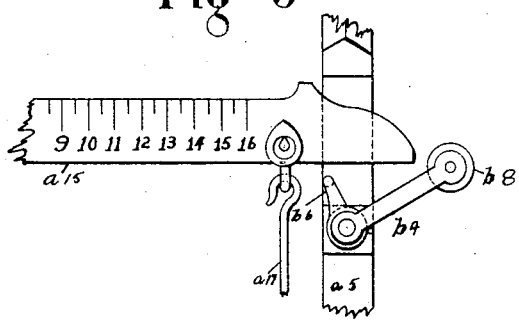
Figure 6:
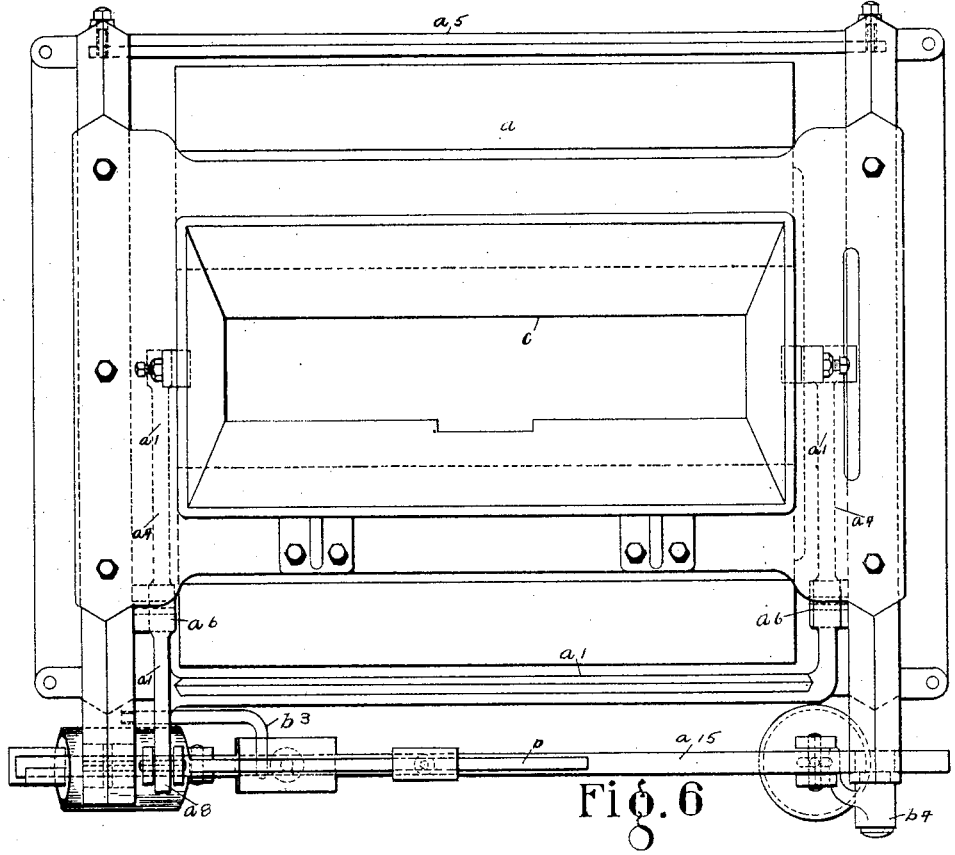
Figure 7:
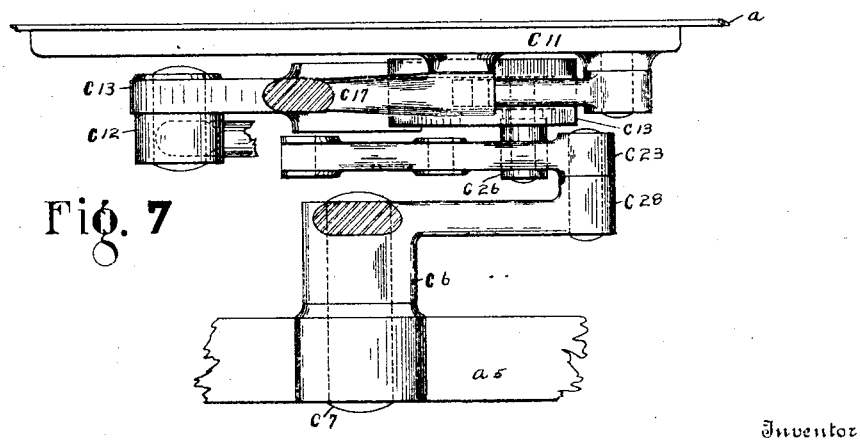

In the drawings, Figure 1 is a perspective view of my machine showing it in position for weighing the "dribble", the major part of the load of material having been received and weighed. Fig. 2 is an end elevation view (with some frame parts broken away) showing the parts in position for receiving the dribbling stream of material. Fig. 3 is a similar view showing the position of parts in discharging a load. Fig. 4 is an elevation view of the front of my machine (with the lower parts cut away) showing particularly the principal weigh beam in its lowest position and largely relieved of the resistance of the supplemental beam which is resting on a pin provided for that purpose. Fig. 5 is a detail view showing the position of parts at the free end of the principal beam when the latter is at its intermediate position. Fig. 6 is a plan view. Fig. 7 is a detail vertical sectional view on the line $x$—$x$ in Fig. 3.

Like reference characters in the different views indicate like parts.

The movable weighing receptacle is designated by letter, $a$. It is suspended from the lever frame, $a^1$, see Figs. 1, 4 and 6, by bearing plates, $a^2$, supported on bearings, $a^3$, from lever arms, $a^4$, (Figs. 2 and 6) of lever frame. The latter is pivoted on the main frame, $a^5$, by bearing plates, $a^6$, supporting bearings, $a^7$ (Figs. 2 and 4). Lever arm, $a^8$, of lever frame supports the weigh beam by means of link, $a^{10}$, which is suspended from bearing, $a^9$, on lever arm, $a^8$, and connects with link, $a^{11}$, which supports the weigh beam, $a^{12}$, by bearing, $a^{13}$. The weigh beam is fulcrumed at bearing, $a^{14}$, on the main frame, $a^5$. I have preferably shown the movable weighing receptacle connected with the short arm of the weigh beam. I have also preferably employed compound knife-edge bearings for bearings, $a^3$ and $a^7$. The primary bearings of this compound bearing is shown in the view of bearing, $a^7$, Fig. 2. The secondary bearing is shown in the view of bearings, $a^7$, Fig. 4. The long arm of the weigh beam which may be hereinafter called the principal weigh beam, $a^{15}$, is provided with the usual movable poise, $a^{16}$, which may hereafter be called the principal poise, poise pendant, $a^{17}$, and balance ball, $a^{18}$. Gate, $a^{19}$, is adapted, by gravity, to normally close the outlet of the weighing receptacle. The weigh beam, $a^{12}$, constitutes the balancing member of the apparatus. As shown in Fig. 4, the principal beam is graduated to U. S. standard of weight and whether the standard scale is used independently or as a part of my complete automatic apparatus it will serve to indicate in U. S. standard units the load of material in the weighing receptacle.

Upon the principal beam at the right of fulcrum, $a^{14}$, I have pivotally secured a supplemental beam, $b$, and provided it with a supplemental poise, $b^1$. As shown this beam is also graduated to U. S. standard of weight, both to the right and left of zero point (Fig. 4). When balancing the standard scale supplemental poise, $b^1$, should be at zero. When this poise is moved to the right of zero, the resistance to the principal beam is increased and when it is moved to the left of zero the resistance is decreased.

I have formed a shoulder, $b^2$, (Fig. 4) on the principal beam which contacts with the supplemental beam as the former approaches its intermediate position as hereinafter explained, and I have provided a pin, $b^3$, which projects from the main frame under the supplemental beam so that it may rest upon the pin, $b^3$, as shown in Fig. 4. As also shown therein, when the principal beam is in its lowest position the weight of the supplemental beam is partially borne on pin, $b^3$, and the principal beam is correspondingly relieved. As the principal beam rises it meets with minimum resistance (weight) from the supplemental beam and poise until the principal beam approaches its intermediate position, then shoulder, $b^2$, contacts with supplemental beam and the principal beam meets the maximum resistance (weight) of the supplemental beam and poise.

The above supplemental beam and poise constitute specific additional means for the following purposes:—Independent supplementary weighing. Independently weighing the "excess", said excess being hereinafter defined. Independently setting my apparatus so that such excess will not occur in subsequent operations. Independently determining the amount of material to be received in the weighing receptacle during the second or dribble operation, so that the weight of the total amount of material received in the weighing receptacle at each complete operation will be the weight indicated on the principal beam as predetermined and to which the apparatus was set.

It is especially desirable to check the principal beam at its intermediate position for otherwise its momentum might carry it past said position. I accomplish this by means of check, $b^4$, which is pivoted at $b^5$ to a bracket on the main frame. This check comprises lug, $b^6$, and arm, $b^7$, which carries at its free end a roller, $b^8$. When the weigh beam approaches its lowest position it contacts with lug, $b^6$, causing check, $b^4$, to turn on its pivot so that roller, $b^8$, is carried to a position above the weigh beam, as shown in Fig. 4. When the movable weighing receptacle begins its first downward movement, the weigh beam rises and, contacting with roller, $b^8$, is checked and its momentum and vibrations quickly overcome. By reason of the roller contacting with a beveled surface on the weight beam and the vibrations of the latter intermittently breaking this contact the arm, $b^7$, is quickly thrust aside (Fig. 5) leaving the weigh beam free to rise to its highest position when the unit of weight is reached.

It will be seen that I have a jointed, two-part weigh beam so arranged as to provide the means for independent primary and supplementary weighing at each automatic operation of my machine, which weighings correspond to the two operations into which, in common practice, each automatic weighing is divided. When used as a common standard weighing apparatus, i. e. with the attachment for causing the machine to discharge automatically disconnected, this beam would serve as a double beam or the supplemental beam would serve as a tare beam as in ordinary scales. It is to be understood that I have illustrated merely one form of construction for independent weighing and I do not desire to be limited to this specific construction or method, for it is obvious that a variety of similar methods could be employed.

Reference letter, $c$, designates the stationary receptacle which is of the usual construction constituting in effect a hopper for receiving and holding the material. This receptacle is provided with a swinging cut-off, $c^1$, which is adapted to normally close, by gravity, the outlet thereof. This cut-off swings on pivots, $c^2$. Forked arm, $c^3$ is also pivoted at $c^2$, and engages intermediate forked lever, $c^4$, pivoted at $c^5$ to main frame. $c^4$ engages pendant, $c^6$, the latter being pivoted at $c^7$ to main frame, $a^5$. The lower end of the pendant, $c^6$, is adapted to engage gravity pawls, $c^8$ and $c^9$, which are pivotally and adjustably secured to segment bracket $c^{10}$, which is secured to plate, $c^{11}$, which in turn is secured to movable weighing receptacle, $a$. Connecting member, $c^{12}$, connects gate, $a^{19}$, to cam, $c^{13}$, which is pivoted at $c^{14}$ to plate, $c^{11}$.

As shown in Fig. 2, the parts are in position for final movement or operation—the major part of the material has been received in the movable weighing receptacle and it has made its initial downward movement permitting a partial closing of the swinging cut-off to stationary receptacle, and the parts have moved to position as shown in Fig. 2. Now, the full load having been received, the movable weighing receptacle moves to its lowest position. This movement carries down pawl, $c^8$, sufficiently to release pendant, $c^6$. While the latter was held by pawl, $c^8$, cut-off, $c^1$, was prevented from closing. As soon as the pendant is released from pawl, $c^8$, this cut-off closes by gravity and the parts move to position shown in Fig. 3. Trip, $c^{15}$, is pivoted pendant, $c^6$, and is adapted to be thrown to operative and inoperative positions as shown in Fig. 2. When pendant, $c^6$, moved to the position shown in Fig. 3, the stud, $c^{16}$, on the end of trip, $c^{15}$, contacted with the crank arm, $c^{17}$, pivoted at $c^{18}$ to plate, $c^{11}$. Arm, $c^{17}$, is formed with a short arm, $c^{19}$, which acts as a lock to gravity latch, $c^{20}$, pivoted at $c^{21}$ to plate $c^{11}$. The completion of the above movement of the pendant moved short arm, $c^{19}$, to unlocking position releasing gravity latch, $c^{20}$, which is formed to engage a beveled shoulder, $c^{22}$, on cam, $c^{13}$. When so released this catch is lifted by reason of the pressure of the beveled shoulder due to the weight of material on gate, $a^{19}$, and the parts move to the position shown in Fig. 3.

The return of the parts to a position opposite that shown in Fig. 3, is due to the closing, by gravity, of gate, $a^{19}$, as soon as the material has all been discharged. A pawl, $c^{23}$, is formed with a slot, $c^{24}$. A pin, $c^{25}$, projects from pendant, $c^6$, and fits within this slot so as to permit a limited movement of pawl, $c^{23}$, independent of the pendant. As cam, $c^{13}$, moved from its position in Fig. 2 to its position in Fig. 3, roller, $c^{26}$, pivoted on cam, $c^{13}$, contacted with the under side of pawl, $c^{23}$, and raised it until the movement of the cam had carried the roller clear from the pawl, then the latter dropped into the position shown in Fig. 3. With the return movement of cam, $c^{13}$, by reason of the contact of roller, $c^{26}$, against pawl, $c^{23}$, which is pivoted at $c^{27}$ on extension, $c^{28}$, of pendant, $c^6$, the latter is moved to its retracted position where it is held by pawl, $c^9$. Toward the end of this return movement roller, $c^{26}$, moved out of contact with pawl, $c^{23}$, by reason of cam, $c^{13}$, moving in a different arc from the pendant, $c^6$, and pawl, $c^{23}$.

It will be seen that the movement of pendant, $c^6$, to its retracted position so that its lower end was back of pawl, $c^9$, moved cut-off, $c^1$, to open position for receiving a full stream of material. When sufficient material has been received movable weighing receptacle moves down, thus freeing the pendant from pawl, $c^9$, and by reason of the gravity movement of cut-off, $c^1$, the pendant is moved to pawl, $c^8$, and the parts are in position as shown in Fig. 2. When in this position it will be plain if trip, $c^{15}$, should be raised to its inoperative position, as shown by dotted lines in Fig. 2, so as to clear crank arm, $c^{17}$, that, when the load has been received in the movable weighing receptacle it will move down to its lowest position but the mechanisms that open the gate, $a^{19}$, will not be operated and therefore the load will be held for testing or re-weighing. To discharge the load move crank arm, $c^{17}$, until gravity latch, $c^{20}$, is unlocked. If at the same time trip, $c^{15}$, is moved to its normal position the operation of the machine will be indefinitely repeated. If trip, $c^{15}$, is not so moved, there will be but a single operation and the load will be held as before.

To primarily start the machine open cut-off, $c^1$, by actuating rod, $c^{29}$, which is formed with a shoulder, $c^{30}$, (Fig. 3) adapted to contact with lever, $c^4$.

Having explained the construction and functions of the different parts I shall briefly describe the sequence of operations.

Having disconnected the automatic attachment and adjusted both the principal and supplemental poise at zero I bring the scale to a balance by means of balance ball, provided for that purpose. The unit of weight having been decided upon, I place weights on the poise hanger, $a^{17}$, and adjust principal poise to equal said unit. For example: Having decided upon a unit of 35 pounds I place weights representing 30 pounds upon the poise hanger and move the principal poise to the 5 pound graduation on the principal beam. For the purpose of completing the adjustment of my machine it is necessary to cause only one automatic weighing and to hold the load in the weighing receptacle. Having raised the trip, $c^{15}$, to its inoperative position, I start the flow of material into the weighing receptacle by pushing in actuating rod, $c^{29}$, until lower end of pendant, $c^6$, engages pawl, $c^9$. As soon as the movable weighing receptacle has received something like 98 per cent. of the unit it drops sufficiently for pendant, $c^6$, to disengage pawl, $c^9$, and to move forward and engage pawl, $c^8$. This initial downward movement of the weighing receptacle raises the principal beam to its intermediate position where it is checked and receives the maximum weight of the supplemental beam with its poise at zero. Simultaneously the stream of material is throttled to dribbling condition. In other words the movement of the pendant, $c^6$, from pawl, $c^9$, to pawl, $c^8$, permitted cut-off, $c^1$, to partially close thereby throttling the stream of material sufficiently to make it dribble in a much smaller stream. When sufficient additional material is received into the movable weighing receptacle to overcome the weights upon the principal beam plus the weight of the supplemental beam and poise, the movable weighing receptacle drops to its lowest position and weigh beam moves to its highest position. During the last movement of the movable weighing receptacle pawl, $c^8$, is carried down sufficiently to release the pendant, $c^6$, which permits cut-off, $c^1$, to close completely, thus shutting off the flow of material. The load of material will be held in the weighing receptacle.

It is well known in the art of automatic weighing that an appreciable amount of material is received in the movable weighing receptacle during and after the final weighing operation, and even when the dribble feature is employed there is an appreciable amount of material that is received in the movable weighing receptacle after the final operation has been completed, and if not provided against this material would be in excess of the unit of weight. In my machine when the load of material has been received in the movable weighing receptacle three operations, practically simultaneous, follow:—The movable weighing receptacle moves down to its lowest position, the weigh beam moves to its highest position, and the stream of material is cut off at the stationary receptacle. It will be plain that, thereafter, in the above example, as my machine is now set to 35 pounds with the dribble poise at zero, the material that was on the way when the stream was cut off at the stationary receptacle was received in the movable weighing receptacle and would be in excess of 35 pounds. To ascertain the exact weight of this excess I move the supplemental poise on the supplemental beam to the right of zero until the weigh beam returns to balancing position, that is, to its intermediate position. Having thus ascertained said weight I move the supplemental poise correspondingly to the left of zero to reduce the resistance to the weigh beam and thereby prevent such excess in subsequent operations. My machine as now set will weigh 35 pounds of material at each automatic weighing and it was so set without disturbing the principal poise, that is, without disturbing the initial setting to the predetermined unit. I have found that in weighing wheat in units of 35 pounds said excess weighed 7 ounces, and by moving the supplemental poise to the 7 ounce graduation to the left of zero on the supplemental beam, that thereafter exactly 35 pounds of wheat would be received, weighed and discharged at each complete automatic operation.

It will now be plain that an operator of my apparatus with a single automatic weighing or operation will be able to set it to any desired unit of weight within its capacity so that at each automatic operation thereafter an identical weight of material will be received, weighed and discharged. Furthermore, after any automatic operation the load can be held in the weighing receptacle and re-weighed by my apparatus in the ordinary manner.

It will also be plain that at any time to test the accuracy of the automatic operation it will only be necessary to hold a load in the movable weighing receptacle and to move the supplemental poise back to zero. If the weigh beam then comes to balancing position the accuracy of the automatic operation is demonstrated.

It will be observed in the foregoing example that over 98 per cent. of the load was received in the movable weighing receptacle during the first operation when the material was flowing in maximum volume, thus contributing appreciably to the capacity of my apparatus.

In practice the supply of material having become exhausted, there may remain in the movable weighing receptacle a partial load, which is commonly called "residue" and will hereinafter be so termed. Having a residue it can readily be weighed by throwing trip, $c^{15}$, to inoperative position; remove weights from the weigh beam until it rises to its highest position, then move the supplemental poise to zero and weigh in the ordinary manner.

I have shown an apparatus comprising a standard weighing lever fulcrumed with the minimum amount of friction, the movable weighing receptacle moves in unison with said lever in a sense that no movement of the receptacle occurs without a corresponding movement of the lever.

It will be plain that the adjustment of pawls, $c^8$ and $c^9$, on segment bracket, $c^{10}$, will regulate the capacity of my machine from minimum to maximum. The volume of the throttled or dribbled stream may be regulated by pawl, $c^8$, and the volume of the full stream is regulated by pawl, $c^9$.

A main feature of my invention consists in the simplicity and accuracy of the structure, due to the combination of a movable hopper with movable supporting means and standard weighing appliances, including a main weighing beam and an additional lever, the two forming in effect a compound lever element and so arranged that the two elements move together during part only of the movement of the main beam. This appears from Fig. 4 where it is seen that the supplemental lever, which in this instance is shown above the main weigh beam and pivotally connected therewith, moves with the main beam during the latter part of the main beam movement, but it is also apparent that the supplemental beam, by reason of its arrangement, necessarily gives to the main beam an initial impulse and I employ a check or retarding device which coöperates with the foregoing parts to prevent the main beam from making its entire movement without any pause. In my improved device the main beam when approaching its intermediate position is gradually stopped and held at rest temporarily by the retarding device. The retarding device thereafter automatically drops out of the path of movement of the main beam after it has accomplished its main object of holding the beam at rest for a sufficient period. In a broad sense, therefore, my invention consists in so combining the compound balancing element that its main beam may receive an initial impulse and yet the parts associated therewith will hold the main beam from making its complete movement without a pause, and it is apparent that it is immaterial whether the supplemental beam is supported on or above the main beam or at some other convenient position. It is only necessary to employ a balancing element which is, in effect, a compound lever element so arranged that one of the parts will give an initial impulse to the beam relying upon the retarding device for preventing the beam from making its complete movement without a pause.

Having thus described my invention, I claim:—

1. In a weighing machine, the combination of a movable hopper capable of being loaded, movable means for supporting said hopper, a balancing lever member comprising two movable elements compounded together for weighing the major portion of the load and also the minor portion of said load, a movable device for retarding said member near the end of the weighing of the major portion and prior to the weighing of said minor portion, and means coöperating with said balancing member to automatically withdraw said movable device, substantially as specified.

2. In a weighing machine, the combination of a movable hopper capable of being loaded, movable means for supporting said hopper, a balancing member comprising two movable elements compounded together for weighing the major portion of the load and also the remainder of the said load, a movable device for retarding said member near the end of the weighing of the major portion and prior to the weighing of the remainder of said load, and means coöperating with said balancing member for disengaging it from said retarding device, and means on one of said movable elements for thereafter weighing the excess free from said retarding element.

3. In a weighing machine, the combination of a movable hopper capable of being loaded, a movable frame supporting said hopper with a compound balancing lever member comprising two movable elements capable of weighing both the major portion of the load and also the remainder of said load, a movable device for retarding said member near the end of its preliminary movement and prior to the weighing of the remainder of said load, and means coöperating with said member for causing thereafter an additional movement of said retarding device whereby the remainder of the load will be weighed free from the influence of said retarding element.

4. In a weighing machine, the combination of a movable hopper capable of being loaded, with movable means supporting said hopper, a balancing member having main graduations and supplemental graduations thereon for weighing both the major portion of the load and also the remainder of the load, including a main and a supplemental beam compounded together, and means for causing said supplemental beam to give an initial impulse to the main beam, and a movable device for retarding said main beam after it has been given the initial impulse aforesaid, and means coöperating with said balancing member for automatically disengaging thereafter said retarding element and permitting said beam to weigh the remainder of the load free from the influence of said retarding element, substantially as specified.

5. In a weighing machine, the combination of a movable hopper capable of being loaded, with movable means for supporting said hopper, a main lever member additional to said supporting means and suspended therefrom, a supplemental lever member for giving to said main lever member an initial impulse, main graduations and supplemental graduations for weighing the major portion and the remainder of the load, and a movable device normally inactive but near the end of the weighing of the major portion coöperating with said main member for retarding it, substantially as specified.

6. In an automatic weighing apparatus, the combination with standard weighing appliances, including a weighing receptacle capable of being loaded, a lever frame with a plurality of arms, a graduated principal balancing member and means for checking same after an initial movement thereof; of a supplementary graduated balancing lever pivoted on the principal balancing member, a poise for adding resistance in graduated units to said principal balancing member after an initial movement thereof.

7. In a weighing machine, the combination of a hopper, a movable frame supporting said hopper, a steelyard weighing member, a plurality of series of graduations on said member, a plurality of poises coöperating with said graduations, an arm projecting from said movable frame transverse to said steelyard, and flexible means coupling said arm to said steelyard, for the purpose specified.

8. In a weighing machine, the combination of a hopper, a movable supporting frame for said hopper, including an arm projecting therefrom, an additional balancing member of the steelyard type, a plurality of series of graduations on said steelyard, and a plurality of poises coöperating therewith, connections between said projecting arm and said steelyard, and a retarding device at the free end of said steelyard, substantially as specified.

9. In a weighing machine, the combination of a movable hopper, a movable supporting frame for said hopper including an arm projecting therefrom, a two-part lever of the third order suspended transversely to said projecting arm, and means connecting said arm and said lever, and means for giving to said lever an initial pull, and a retarding device coöperating with said levers to arrest same, substantially as specified.

10. In a weighing machine, the combination of movable hopper, a frame supporting said hopper, an arm projecting from said frame, a separate graduated balancing member suspended transverse to said arm, a supplemental arm supported on said balancing member having graduations thereon, the zero point of which graduation is intermediate of the other graduations, substantially as specified.

11. In a weighing machine, the combination of a movable hopper, a frame supporting said hopper, an arm projecting from said frame, a separate graduated balancing member suspended transverse to said arm, a supplemental arm supported near one end of said balancing member having graduations thereon, the zero point of which graduation is intermediate of the other graduations, and a movable retarding device coöperating with the other end of said main balancing member, substantially as specified.

12. The combination of a movable hopper capable of being loaded with weighing apparatus comprising a main supporting frame connected to said hopper, and a separate single weighing lever fulcrumed near one end thereof, and means for connecting the frame to said lever near its fulcrum, a supplemental arm supported on said lever and projecting therefrom near said fulcrum, a plurality of graduations on said arm extending to the right and to the left of the zero graduation, substantially as and for the purpose specified.

13. In a weighing machine, the combination of a movable hopper, a stationary frame, supporting frame for said hopper fulcrumed on said stationary frame, a separate single balancing member having a plurality of series of graduations, one of said series being graduated with numbers to the right and to the left of the zero mark, and a plurality of poises each coöperating with a corresponding series of graduations, and connections for said supporting frame and said balancing member on one side of the fulcrum of said supporting frame, and connections between the hopper and supporting frame on the opposite side of said fulcrum, a retarding device coöperating with said balancing member, for the purpose specified.

In testimony whereof, I have hereunto set my hand this 1st day of January 1908.

ANDREW SONANDER.

Witnesses:
B. H. WINTERS,
CHAS. I. WELCH.